US008990608B1

(12) United States Patent
Gupta et al.

(10) Patent No.: US 8,990,608 B1
(45) Date of Patent: Mar. 24, 2015

(54) FAILOVER OF APPLICATIONS BETWEEN ISOLATED USER SPACE INSTANCES ON A SINGLE INSTANCE OF AN OPERATING SYSTEM

(75) Inventors: Setu Gupta, Mahrashtra (IN); Sumit A. Mulewar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 162 days.

(21) Appl. No.: 13/603,177

(22) Filed: Sep. 4, 2012

(51) Int. Cl.
  *G06F 11/00* (2006.01)
  *G06F 11/20* (2006.01)

(52) U.S. Cl.
  CPC .................................. *G06F 11/2028* (2013.01)
  USPC ............................................................ 714/3

(58) Field of Classification Search
  CPC ............ G06F 11/2028; G06F 11/2025; G06F 11/2046; G06F 11/2038; G06F 11/2023; G06F 11/2097
  USPC ............................................................... 714/3
  See application file for complete search history.

(56) References Cited

U.S. PATENT DOCUMENTS

| 2009/0276200 A1* | 11/2009 | Beyer et al. ...................... 703/13 |
| 2010/0094948 A1* | 4/2010 | Ganesh et al. ................. 709/212 |
| 2012/0144232 A1* | 6/2012 | Griffith et al. ............... 714/4.12 |

* cited by examiner

*Primary Examiner* — Yair Leibovich
(74) *Attorney, Agent, or Firm* — Brill Law Office; Jeffrey Brill

(57) ABSTRACT

An application is failed-over between containers on a single operating system instance. A container is associated with the application, and the application runs therein. An identifier of the container currently associated with the application is maintained as a member of the application group. A listing of a current state of each container is maintained, for example in a file. If the current container goes offline or faults, a separate container currently in an available state is identified, and the identifier of the current container in the application group is updated. The application is subsequently started-up in the separate, container, thereby failing-over the application between containers on the single operating system instance.

20 Claims, 5 Drawing Sheets

FAILOVER OF APPLICATIONS BETWEEN ISOLATED USER SPACE INSTANCES ON A SINGLE INSTANCE OF AN OPERATING SYSTEM

TECHNICAL FIELD

This disclosure pertains generally to application high availability, and more specifically to failover of applications between multiple, isolated containers running within a single instance of an operating system.

BACKGROUND

High-availability clusters (also known as HA clusters or failover clusters) are groups of computers that support running server applications with a minimum of down-time. A high-availability cluster uses groups of redundant computing resources in order to provide continued service when individual system components fail. More specifically, high-availability clusters eliminate single points of failure by providing multiple servers, multiple network connections, redundant data storage, etc.

Absent clustering, if a server running a particular application fails, the application would be unavailable until the server is restored. In high-availability clustering, the failure of a server (or of a specific computing resource used thereby such as a network adapter, storage device, etc.) is detected, and the application that was being run on the failed server is automatically restarted on another computing system (i.e., another node of the cluster). This process is called "failover." As part of this process, high availability clustering software can configure the node to which the application is being moved, for example mounting a filesystem used by the application, configuring network hardware, starting supporting applications, etc.

Virtualization of computing devices can be employed in high availability clustering and in other contexts. Operating system level virtualization is a virtualization method in which a single instance of an operating system with a single kernel supports multiple, isolated user-space level execution environments, each of which can be used to run a separate application. There are a number of scenarios in which it could be desirable to run multiple, isolated execution spaces within a single instance of an operating system, for example to isolate server applications with different security needs or required system configurations.

Different operating systems support operating system level virtualization, and use different names to describe this functionality. For example, isolated user space instances on a single instance of an operating system are known as zones under Solaris, jails under various Linux based operating systems and WPARs under AIX. The generic term "container" is also sometimes used to denote an isolated user space instance. For consistency and readability, the term "container" will be used herein to denote an isolated user space instance running under any supporting operating system. It is to be understood that where the term "container" is used herein, the term refers to isolated user space instances on a single instance of an operating system generally, including those with other names, and those running under operating systems other than Solaris, Linux and AIX.

It is to be understood that operating system level virtualization, in which multiple isolated containers run on a single instance of an operating system, is distinct from system level virtualization. In system level virtualization, one or more virtual machines (VMs or guests) can be instantiated at a software level on a physical computer (host computer or host), such that each VM runs its own operating system instance.

Just as server level software applications such as databases, enterprise management solutions and e-commerce websites can be run on physical computers, so too can server applications be run on operating system level containers or system level virtual machines. In order to provide an application with high availability, the application can be run on a container or virtual machine which is in turn running on a high-availability cluster.

Conventional clustering solutions allow failover between physical computers and/or between system level VMs, as well as between containers running on different operating system instances. However, existing HA clusters do not support failover between clusters running on a single operating system instance, or between a container and the global user space of the operating system instance on which the container is running. It would be desirable to address this shortcoming of conventional clustering systems for a number of reasons. For example, running multiple operating system instances requires the utilization of additional hardware and software resources. Additionally, failing over applications between operating system instances imposes a time overhead and administrative burden.

SUMMARY

An inter-container failover management system fails-over an application between different ones of a plurality of isolated user space instances (containers) on a single instance of an operating system, according to various embodiments of the present invention. One of the plurality of isolated user space instances on the single instance of the operating system is associated with the application, and the application is run in that specific, isolated user space instance. In some embodiments, an application group is maintained, comprising the application, an identifier of an isolated user space instance currently associated with the application, and resources used by the application. For each separate one of the isolated user space instances, a separate isolated user space instance group can be maintained, comprising an resources used by the isolated user space instance. In some embodiments, the application group is dependent upon at least one of the isolated user space instance groups being in an available state for running the application.

In some embodiments, a listing of current states of each one of the plurality of isolated user space instances on the single instance of the operating system is maintained, wherein each one the plurality of isolated user space instances is configured such that the application can run therein when the isolated user space instance is in an available state. In one embodiment, an agent monitors the isolated user space instances, and writes an identifying label and the current state of each isolated user space instance to the listing, for example to a file located outside of any one of the isolated user space instances.

It can be determined that the application is to be moved from the specific isolated user space instance associated with the application to a separate, isolated user space instance which is currently in an available state for running the application therein. This determination can be made, for example, by detecting that the isolated user space instance associated with the application is not currently in an available state for running the application therein, responsive to monitoring the current state of the isolated user space instance associated with the application. This can further comprise detecting that the isolated user space instance associated with the application is offline, or that the isolated user space instance associated with the application is faulted. One of the plurality of isolated user space instances which is currently in an available state for running the application therein can be identified. It is to be understood that the identified isolated user space instance is separate from the specific isolated user space instance associated with the application. This identification can comprise reading the listing of current states of each one of the plurality of isolated user space instances, and identifying an isolated user space instance that is online and not faulted. In a scenario in which none of the isolated user space instances are in an available state for running the application therein, one of the isolated user space instances can be brought online.

When a new isolated user space instance is identified as being currently in an available state for running the application therein, the association between the application and the specific isolated user space instance is modified, so that the application is no longer associated with the specific isolated user space instance and is instead associated with the separate, identified isolated user space instance. This can take the form of setting the identifier of the isolated user space instance currently associated with the application in the application group, to identify the separate, identified isolated user space instance. The application is subsequently started-up in the separate, identified isolated user space instance now associated with the application, thereby failing-over the application from the specific isolated user space instance on the single instance of the operating system to the separate, identified isolated user space instance on the single instance of the operating system.

In some embodiments, the determination that the application is to be moved from the specific isolated user space instance to a separate, isolated user space instance can be made by detecting that the application is not running, responsive to monitoring the current state of the application. Where this comprises detecting that the application is faulted, it can be attempted to restart the application in the isolated user space instance associated with the application. If the retry attempts exceed a retry limit, the application can be failed-over to a separate, identified isolated user space instance on the single instance of the operating system. Detecting that the application is not running can also take the form of detecting that the application is offline, in which case when the application is subsequently started-up, it will be started-up in the isolated user space instance associated with the application. In other embodiments, the determination that the application is to be moved from the specific isolated user space instance to a separate, isolated user space instance can be made responsive to receiving an indication to move the application from the specific isolated user space instance to a separate, target isolated user space instance.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
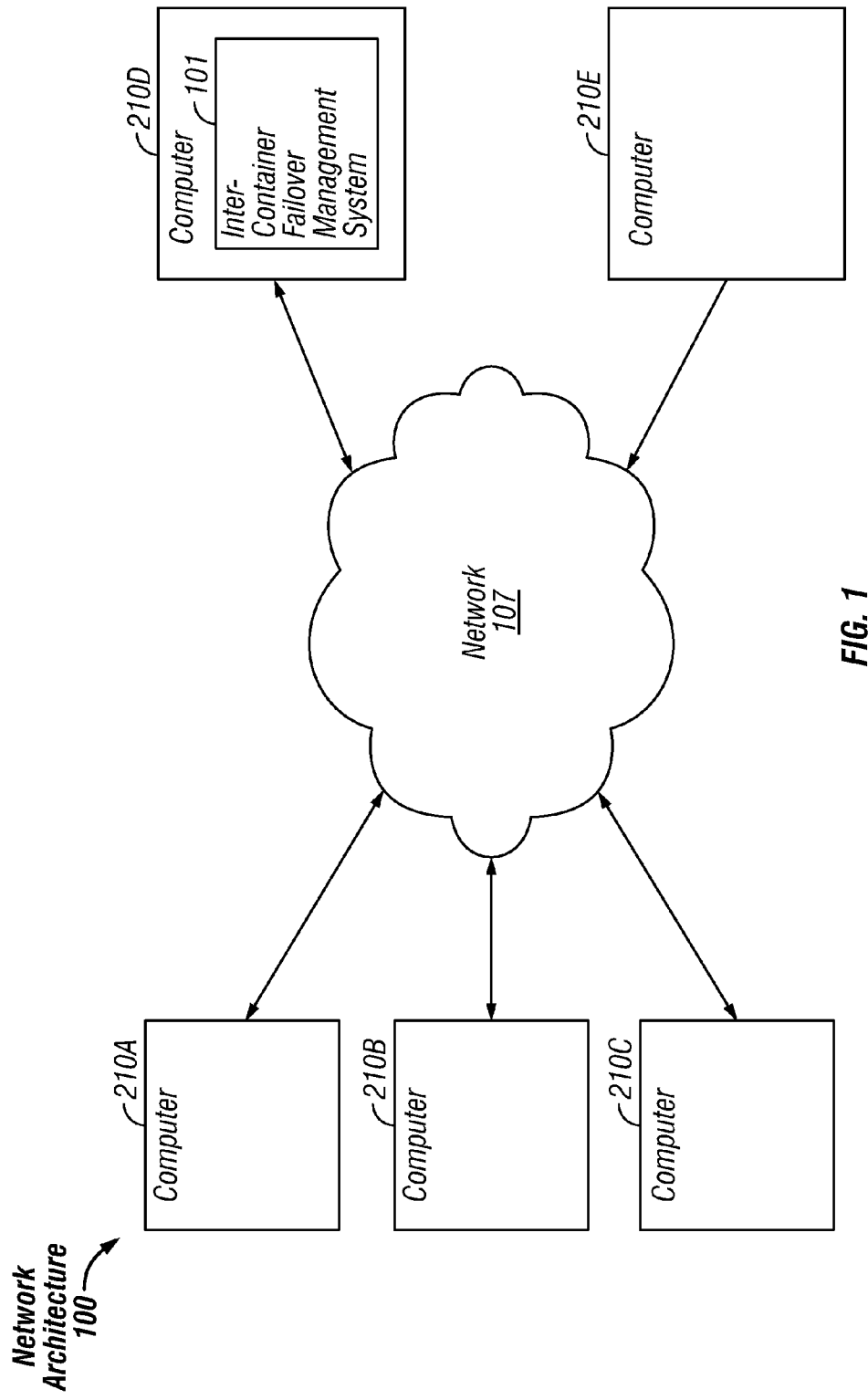
FIG. 1 is a block diagram of an exemplary network architecture in which an inter-container failover management system can be implemented, according to some embodiments.

FIG. 1 is a block diagram illustrating an exemplary network architecture 100 in which an inter-container failover management system 101 can be implemented. The illustrated network architecture 100 comprises multiple computers 210A, 210B, 210C, 210D and 210N. In FIG. 1, the inter-container failover management system 101 is illustrated as residing on computer 210D. It is to be understood that the computers 210 in FIG. 1 can be in the form of server and/or clients as desired.

The computers 210 are communicatively coupled to a network 107, for example via a network interface 248 or modem 247 as described below in conjunction with FIG. 2. Where some of the computers 210 are in the form of clients and others in the form of servers, clients are able to access applications and/or data on servers using, for example, a web browser or other client software (not shown).

Although FIG. 1 illustrates five computers 210 as an example, in practice many more (or fewer) computers 210 can be deployed. In one embodiment, the network 107 is in the form of the Internet. Other networks 107 or network-based environments can be used in other embodiments.

Figure 2:
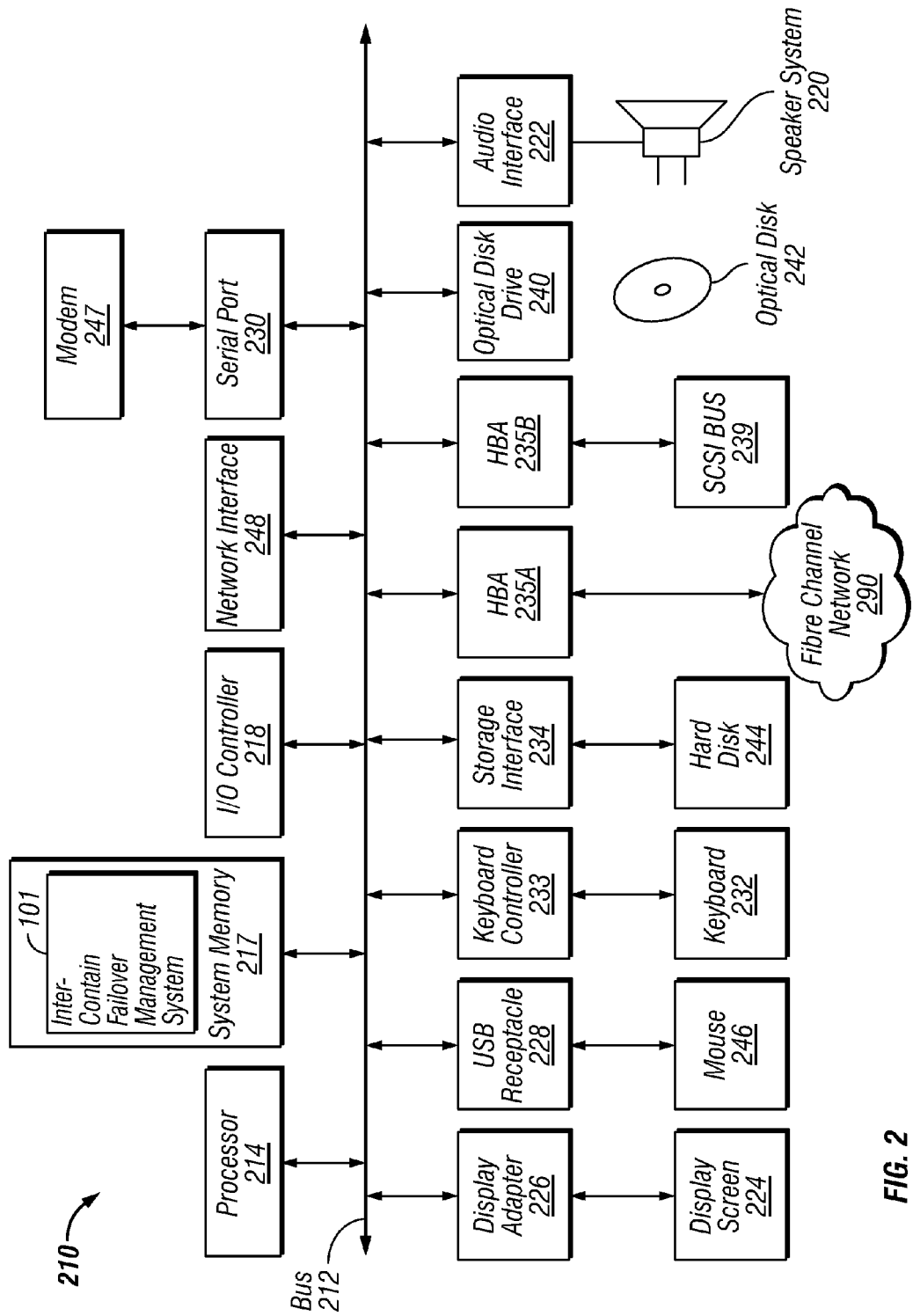
FIG. 2 is a block diagram of a computer system suitable for implementing an inter-container failover management system, according to some embodiments.

FIG. 2 is a block diagram of a computer system 210 suitable for implementing an inter-container failover management system 101. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the inter-container failover management system 101 is illustrated as residing in system memory 217. The workings of the inter-container failover management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
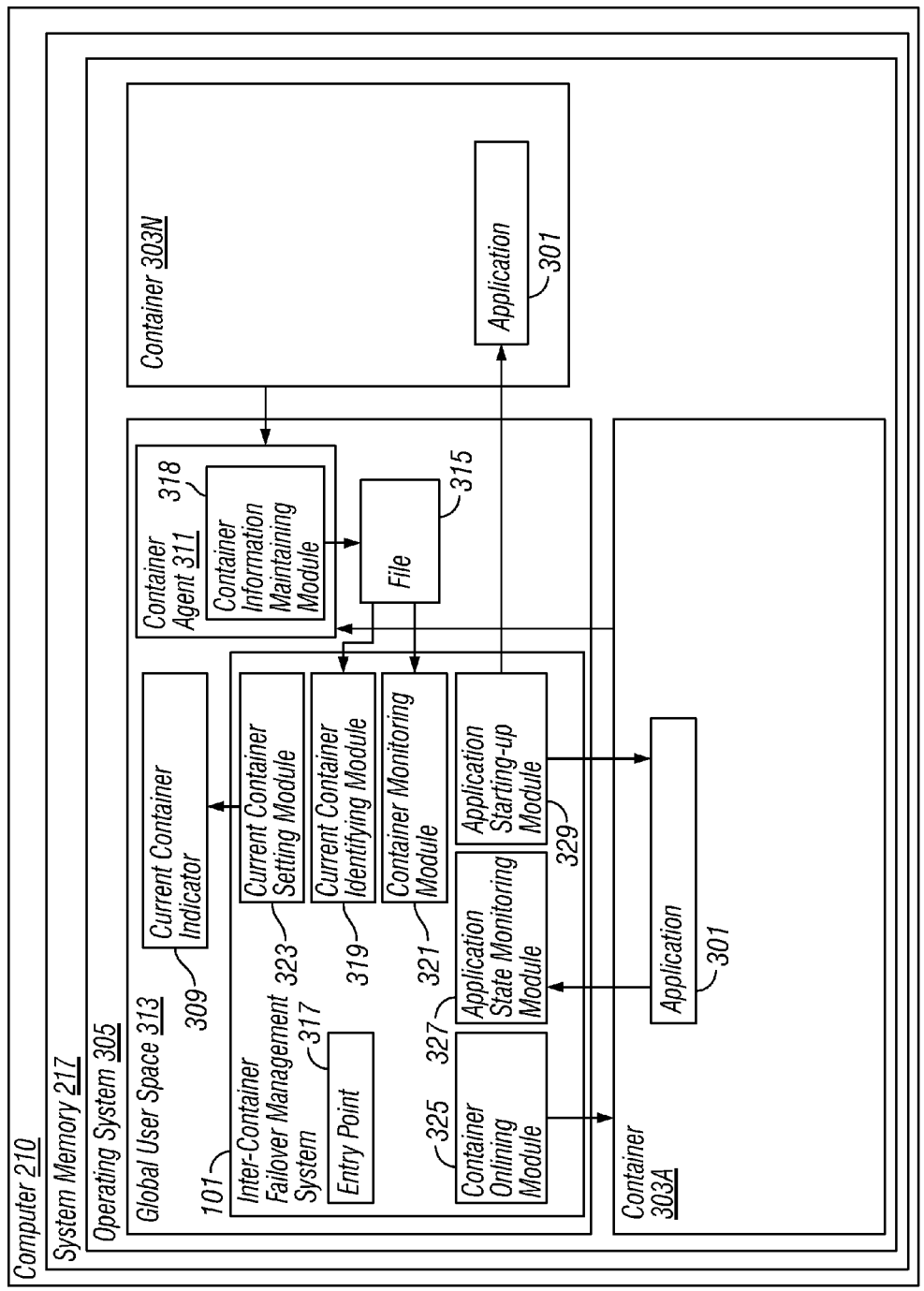
FIG. 3 is a block diagram of an inter-container failover management system, according to some embodiments.

FIG. 3 illustrates the operation of an inter-container failover management system 101, according to some embodiments. The functionalities of the inter-container failover management system 101 can reside on a client, a server, or be distributed between multiple computer systems 210, including within a cloud-based computing environment in which the functionality of the inter-container failover management system 101 is provided as a service over a network 107. It is to be understood that although the inter-container failover management system 101 is illustrated in FIG. 3 as a single entity, the illustrated inter-container failover management system 101 represents a collection of functionalities, which can be instantiated as a single or multiple modules as desired (an instantiation of specific, multiple modules of the inter-container failover management system 101 is illustrated in FIG. 3). It is to be understood that the modules of the inter-container failover management system 101 can be instantiated (for example as object code or executable images) within the system memory 217 (e.g., RAM, ROM, flash memory) of any computer system 210, such that when at least one processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the inter-container failover management system 101 can be stored on computer-readable storage media, such that when the program code is loaded into computer memory 217 and executed by at least one processor 214 of the computer system 210, the computer system 210 executes the associated functionality. Any form of non-transitory computer readable medium can be used in this context, such as magnetic or optical storage media. As used herein, the term "computer readable medium" does not mean an electrical signal separate from an underlying physical medium.

As illustrated in FIG. 3, an inter-container failover management system 101 runs on a computer 210 and facilitates failover of an application 301 between multiple containers 303 on a single instance of an operating system 305. For purposes of illustration, only two containers 303 are illustrated in FIG. 3 (container 303A and container 303N), although it is to be understood that in different embodiments many more containers 303 can be present on a single instance of an operating system 305. Other than the inter-container failover management system 101 disclosed herein, no solution allows failing-over an application 301 across different containers 303 within the same instance of the operating system 305. The use of the inter-container failover management system 101 can supplement failing-over applications 301 onto different operating system 305 instances, thereby shortening failover time, lowering resource usage, and enabling failing-over applications 301 to other containers 303, irrespective of whether the other containers 303 are on the same operating system 305 instance or not. Additionally, by using the inter-container failover management system 101, a container 303 can be migrated to any operating system 305 instance in a cluster, and the inter-container failover management system 101 will subsequently ensure that an application 301 running thereon is failed-over to other containers 303 within that same instance.

Figure 4:
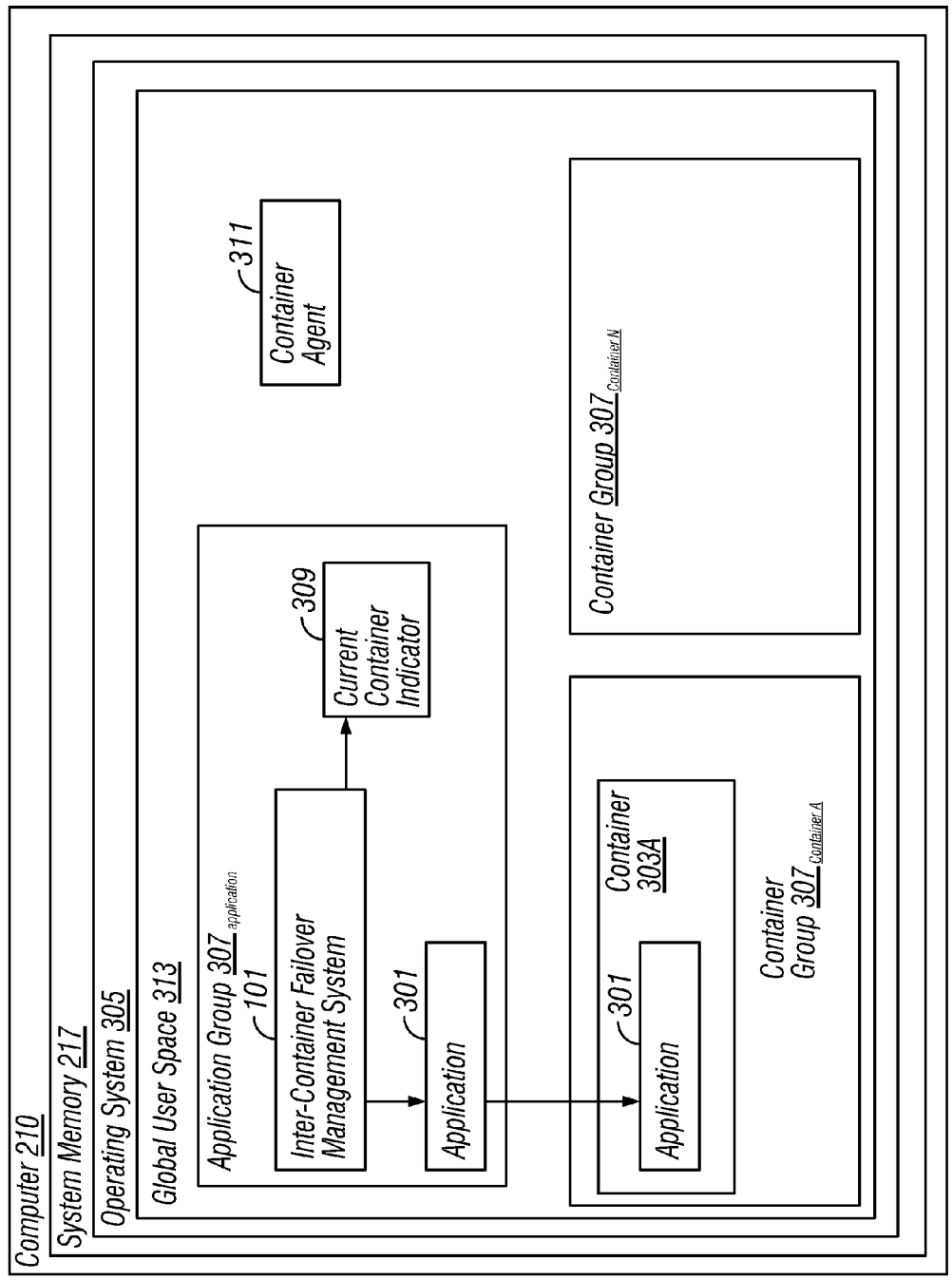
FIG. 4 is a block diagram of an application group and two container groups, according to some embodiments.

Turning momentarily to FIG. 4, the application 301 to be failed-over between multiple containers 303 on a single instance of an operating system 305 is associated with resources it uses (e.g., IP address, mounted file system, etc.) as an application group $307_{application}$. As used herein the term "group" means a collection of associated software and/or hardware computing components, such as those associated with an application 301 or a cluster 303. It is to be understood that some high availability cluster software packages support such component grouping. In some embodiments implemented within the context of high availability cluster systems that provide such grouping functionality, the provided grouping functionality can be used by the inter-container failover management system 101. In other embodiments, the inter-container failover management system 101 associates components into groups 307 without using grouping functionality provided by a high availability cluster system or other third party package.

In some embodiments the inter-container failover management system 101 is also included in the application group $307_{application}$, as well as a data mechanism which indicates the current container 303. As used herein, the term "current container" means the container 303 in which the application 301 is currently running if the application 301 is online, or which the application 301 is to be started-up in or failed-over to if the application 301 is offline or faulted. The data mechanism that indicates the current container 303 is referred to herein as the current container indicator 309, although the specific name is not important. In different embodiments, the current container indicator 309 can be instantiated as a file, a section of a file, a location in memory such as an environment variable, etc. The current container indicator 309 can store the container name, number, and/or another form of identifying label. It is to be understood that some high availability cluster software packages provide a mechanism associated with an application 301 that indicates the application's current container 303. For example, Veritas Cluster Server (VCS) provides a mechanism in an application service group $307_{application}$ called ContainerInfo for this purpose. In embodiments implemented within the context of high availability cluster systems providing such a mechanism, the provided mechanism can be used by the inter-container failover management system 101 to indicate the current container 303 associated with the application 301.

A group 307 is also configured for each container 303 in which the application 301 can be run (i.e., a container group 307$_{container}$), which includes container resources such as storage to be used by the container 303.

In one embodiment, the application group 307$_{application}$ is configured to be dependent on the multiple container groups 307$_{container}$ in an "or" type dependency, meaning that the application group 307$_{application}$ can be brought online when one or more of the container groups 307$_{container}$ are online. In other words, in such an embodiment one or more of the containers 303 in which the application 301 can run are to be online before the application 301 is to be brought online. In another embodiment, the application 301 can run in the global user space 313 of the operating system 305 instance as well as in the containers 303, and thus is not dependent on any container group 307$_{container}$ being online in order to be online itself.

A container agent 311 runs in global user space 313 and monitors the resources of the containers 303. In other words, the container agent 311 detects when container resources, and thus a corresponding container group 307$_{container}$, fail (e.g., fault or go offline). The container agent 311 comprises one or more modules for performing this functionality, and in some embodiments some or all of this functionality is provided by a high availability cluster package. The performance of such functionality by the container agent 311 within the context of embodiments of the present invention is described in more detail below.

The discussion now returns to FIG. 3. Note that for purposes of illustration the application group 307$_{application}$ and container groups 307$_{container}$ are not specifically illustrated in FIG. 3, although the discussion continues to refer to these components. For an illustration of the application group 307$_{application}$ and container groups 307$_{container}$, one may refer to FIG. 4. As described in more detail below, the inter-container failover management system 101 determines the application's current container 303, so as to startup the application 301 in an available container 303, or to failover the application 301 between containers 303 in the same operating system 305 instance as appropriate. To enable such a determination of the current container 303, the states of the various containers 303 are tracked by the container agent 311, and a listing of the current state of each container 303 is maintained. To this end, a container information maintaining module 318 of the container agent 311 writes the name (or another identifying label) and state (e.g., online, offline, faulted) of each container 303 to a file 315 residing outside of any of the containers 303 (e.g., in the global user space 313 of the operating system 305 instance). Thus, the file 315 contains a current listing of the identifiers and states of each container 303 in which the application 301 can run. This file 315 can be implemented with locking mechanisms, to prevent corruption resulting from multiple attempts to write to it simultaneously. In another embodiment, instead of a file 315, the container names and states are maintained in a shared memory location, such as an environment variable (not illustrated) in global user space 313. In yet another embodiment, the container names and states are instead stored in a data mechanism (not illustrated) of the application group 307$_{application}$.

By monitoring the status of the multiple containers 303 and maintaining the value of the current container indicator 309 in the application group 307$_{application}$ to identify a container 303 which is currently online and in which the application 301 can currently run, the inter-container failover management system 101 can ensure that the application 301 is always started-up in a viable container 303 when the application 301 is brought online, and is always failed-over to a viable container 303 when the current container 303 goes offline or faults. More specifically, a current container identifying module 319 of the inter-container failover management system 101 initially identifies the container 303 to set as the application's current container 303, prior to starting-up the application 301. To do, the current container identifying module 319 reads the file 315 (or memory area) containing the container 303 status information, to identify a container 303 which is currently in a state such that the application 301 can run in it. This involves identifying a container 303 which is currently online, and not faulted (a container 303 is considered faulted when its associated resources are faulted). Where multiple containers 303 are online and not faulted, the current container identifying module 319 can, in one embodiment, use a container priority order (set by the inter-container failover management system 101 or externally) to determine which of the currently available containers 303 to set as the application's current container 303. In another embodiment, the current container identifying module 319 selects one of the available containers 303 according to other criteria (e.g., available storage or other resources, at random, etc.).

Once the current container 303 for the application 301 has been determined, a current container setting module 323 of the inter-container failover management system 101 sets the value of the current container indicator 309 in the application group 307$_{application}$ accordingly. In order to set the value of the current container indicator 309 when the application 301 is offline, the current container setting module 323 just sets the value of the current container indicator 309 to indicate the desired container 303 in which the application 301 is to be started-up when brought online. Subsequently, an application starting-up module 329 of the inter-container failover management system 101 reads the value of the current container indicator 309, and starts-up the application 301 in the indicated container 303.

Once the application 301 has initially been started-up in the current container 303, a container monitoring module 321 of the inter-container failover management system 101 monitors the current state of each container 303, by periodically reading the file 315 (or memory location or other resource) as discussed above. The frequency with which the container monitoring module 321 monitors the container states can vary between embodiments (for example, every five seconds, every thirty seconds, every minute, etc.). In one embodiment, rather than monitoring the state of each container 303, the container monitoring module 321 instead monitors the state of the current container 303 only. Either way, the monitoring of the container state(s) detects whether the current container 303 is offline, or whether the current container 303 is faulted. If the current container 303 is offline or faulted, then it is not currently in an available state such that the application 301 can run therein, and thus a new current container 303 is to be identified.

To that end, the current container identifying module 319 determines whether any of the other containers 303 are currently available for running the application 301, and if so determines which one to set as the application's current container 303. As described above, this involves identifying a container 303 which is currently online and not faulted. If the current container identifying module 319 is able to identify and select an available container 303 for the application 301, the current container setting module 323 sets the value of the current container indicator 309 in the application group 307$_{application}$ to this container 303. If none of the containers are available, a container on-lining module 325 of the inter-container failover management system 101 can bring one of the containers 303 online, and the current container setting module 323 sets the value of the current container indicator 309 in the application group $307_{application}$ to that container 303.

In addition to the monitoring of the container 303 state, an application state monitoring module 327 of the inter-container failover management system 101 monitors the state of the application 301, and detects when the application 301 faults or goes offline. The inter-container failover management system 101 can mark the current status of the application 301 at an application group level $307_{application}$ to online or offline as appropriate. Note that the inter-container failover management system 101, without itself going offline, can mark the current status of the application 301 as offline.

Where the application 301 is faulted but the current container 303 is online, rather than updating the current container indicator 309, it is desirable to first attempt to re-start the faulted application in the current container 303. Thus, under these circumstances, the application starting-up module 329 attempts to re-start the application 301 in the current container 303, as indicated by the current container indicator 309. If the initial attempt to restart the application 301 fails, the application starting-up module 329 can try to restart the application 301 an additional number of times according to a retry limit, which can be set by the inter-container failover management system 101 itself, or by another component such as a high availability cluster package. The specific value of the retry limit to use can vary between embodiments (for example, retry once, retry five times, retry ten times, etc.). If the retry limit is reached and the application 301 has not been successfully re-started in the current container 303, then it is possible that a problem with the current container 303 resulted in the faulting of the application 301. For this reason, the current container identifying module 319 attempts to identify and select a new, currently available container 303 for running the application 301, as described above. If the current container identifying module 319 is able to identify and select an available container 303 for the application 301, the current container setting module 323 sets the value of the current container indicator 309 in the application group $307_{application}$ accordingly. As described above, if no other container 303 is available, the container on-lining module 325 can bring one online, and the value of the current container indicator 309 can be set to that one. Once the value of the current container indicator 309 is set to the desired value, the application starting-up module 329 reads the value of the current container indicator 309, and starts-up the application 301 in the indicated container 303, thereby failing-over the application 301 between containers 303 in a single operating system 305 instance. As noted above, in some embodiments the application starting-up module 329 can also start-up the application 301 in global user space 313.

Where the application 301 is offline but not faulted, and the current container is online, then there is no indication of a problem with the application 301 or current container 303. Instead, this state simply indicates that the application 301 is not currently running. Thus, the value of the current container indicator 309 is simply maintained, and the application starting-up module 329 reads the value of the current container indicator 309 and starts-up the application 301 in this container 303 when the application 301 is brought online.

In one embodiment, the inter-container failover management system 101 contains an entry point 317 that supports moving of the application 301 from one container 303 to another, by calling the inter-container failover management system 101 with appropriate parameters (e.g., an indication of the target container 303). To move the application 301 between containers 303 in response to such a call, if the status of the application group $307_{application}$ is online, it is first brought offline before updating the current container indicator 309. To do so, the current container setting module 323 takes the application group $307_{application}$ offline, and probes application group $307_{application}$ resources to ensure that the application group $307_{application}$ is in fact offline. Once the application group $307_{application}$ has been brought offline (or if it is already offline when the entry point 317 executes), the current container setting module 323 updates the current container indicator 309 to identify the target container 303. Subsequently, the application starting-up module 329 reads the value of the current container indicator 309, and starts-up the application 301 in the indicated container 303, thereby failing-over the application 301 between containers 303 in a single operating system 305 instance. Where the target container 303 is offline, the application starting-up module 329 brings the target container group $307_{container}$ online before the application group $307_{application}$, in order to comply with above-described group-level dependencies. These operations would typically be queued and thus performed by the current container setting module 323 and the application starting-up module 329 in the given order. This has the effect of failing-over or otherwise moving the application 301 between containers 303 in a single operating system 305 instance.

In other embodiments, the application 301 can be failed-over or otherwise moved between containers 303 in a single operating system 305 instance in other ways. For example, in one embodiment the current container indicator 309 of the application group $307_{application}$ is set by a pre-online trigger (not illustrated), before the application group $307_{application}$ is brought online. In that embodiment, by setting a re-try limit for attempting to bring the application group $307_{application}$ online, it could be assured that a desired number of attempts (e.g., three, ten, fifteen) to bring the application group $307_{application}$ online is made within the given operating system 305 instance before the application 301 is failed-over to a different operating system 305 instance. In another embodiment, the application 301 can be failed-over between multiple kernel based virtual machines (not illustrated) running on a single operating system 305 instance, for example as loose nodes in a high availability cluster system.

Figure 5:
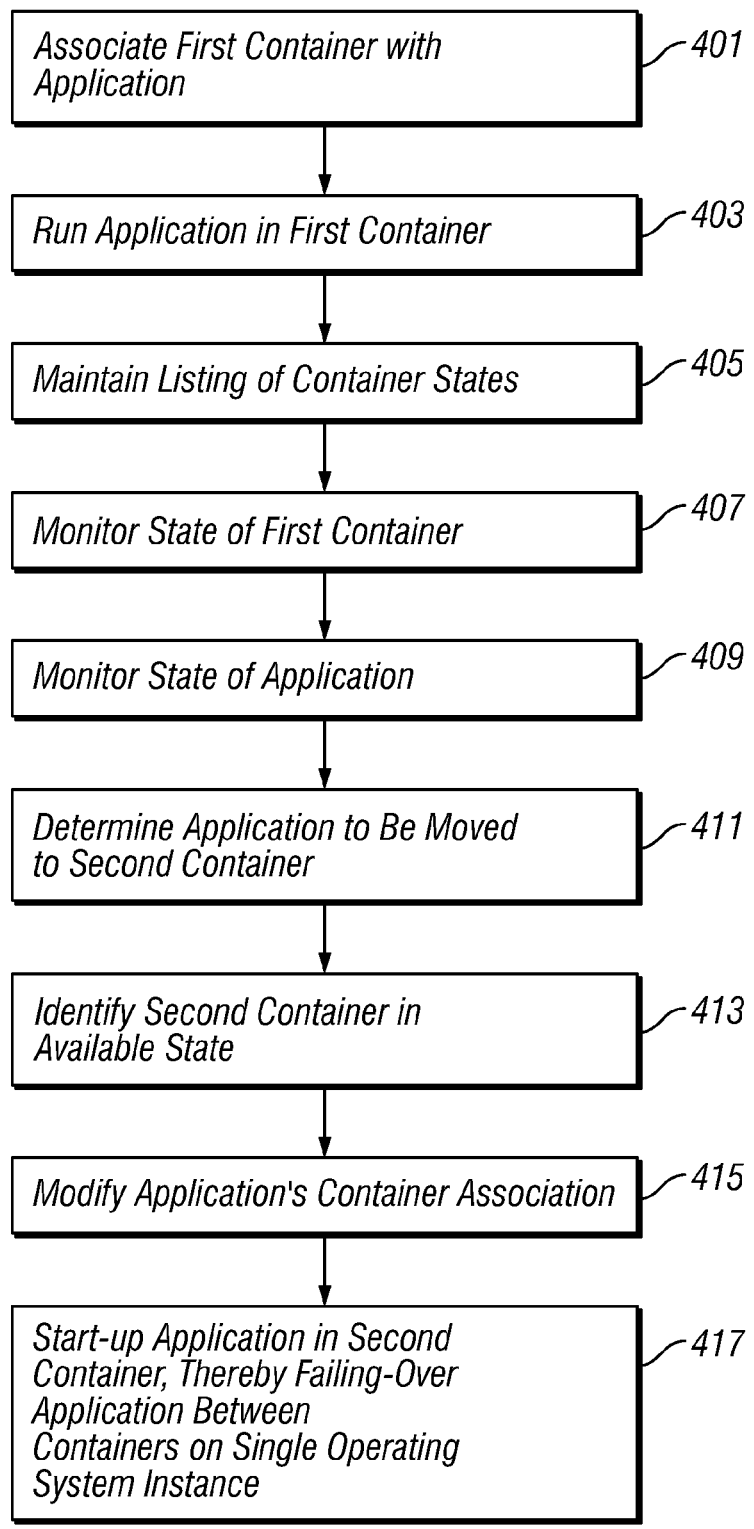
FIG. 5 is a flowchart of the operation of an inter-container failover management system, according to some embodiments.

FIG. 5 illustrates steps for the operation of the inter-container failover management system 101, according to some embodiments. The current container setting module 323 associates 401 a first container 303 on the single instance of the operating system 305 with the application 301. The application starting-up module 329 runs 403 the application 301 in the associated, first container 303. The container information maintaining module 318 of the container agent 311 maintain 405 a listing of current states of each one of the containers 303 on the single instance of the operating system 305, for example in a file 315. The container monitoring module 321 monitors 407 the state of the container 303 with which the application 301 is currently associated, and the application state monitoring module 327 monitors 409 the state of the application 301. The container monitoring module 321 and/or the application state monitoring module 327 determine 411 that the application 301 is to be moved from the first container 303 to a second, separate container 303 which is currently in an available state, responsive to the state of the first container 303 and/or the application 301. The current container identifying module 319 identifies 413 a second, separate container 303 which is currently in an available state. The current container setting module 323 modifies 415 the application's container 303 association, so that the application 301 is no longer associated with the first container 303 and is instead associated with the separate, second container 303. The application starting-up module 329 starts-up 417 the application 301 in the second container 303, thereby failing-over the application 301 between containers 303 on the single instance of the operating system 305.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for failing-over an application between different ones of a plurality of isolated user space instances on a single instance of an operating system, the computer implemented method comprising the steps of:

associating a specific one of the plurality of isolated user space instances on the single instance of the operating system with the application;

running the application in the specific, isolated user space instance associated with the application;

maintaining a listing of current states of each one of the plurality of isolated user space instances on the single instance of the operating system, each one the plurality of isolated user space instances being configured such that the application can run therein when the isolated user space instance is in an available state, wherein maintaining the listing of current states of each one of the plurality of isolated user space instances on the single instance of the operating system further comprises, for each separate one of the isolated user space instances, writing an identifying label and the current state of that isolated user space instance to the listing, by an agent that monitors the isolated user space instances;

determining that the application is to be moved from the specific isolated user space instance associated with the application to a separate, isolated user space instance which is currently in an available state for running the application therein;

identifying one of the plurality of isolated user space instances which is currently in an available state for running the application therein, the identified isolated user space instance being separate from the specific isolated user space instance associated with the application;

modifying the association between the application and the specific isolated user space instance, so that the application is no longer associated with the specific isolated user space instance and is instead associated with the separate, identified isolated user space instance; and starting-up the application in the separate, identified isolated user space instance now associated with the application, thereby failing-over the application from the specific isolated user space instance on the single instance of the operating system to the separate, identified isolated user space instance on the single instance of the operating system.

2. The computer implemented method of claim 1 wherein determining that the application is to be moved from the specific isolated user space instance to a separate, isolated user space instance further comprises:

receiving an indication to move the application from the specific isolated user space instance to a separate, target isolated user space instance.

3. The computer implemented method of claim 1 wherein writing an identifying label and the current state of an isolated user space instance to the listing further comprises:

writing the identifying label and the current state of the isolated user space instance to a shared location located outside of any one of the isolated user space instances.

4. The computer implemented method of claim 1 wherein determining that the application is to be moved from the specific isolated user space instance to a separate, isolated user space instance further comprises:

detecting that the isolated user space instance associated with the application is not currently in an available state for running the application therein, responsive to monitoring the current state of at least the isolated user space instance associated with the application.

5. The computer implemented method of claim 4 wherein detecting that the isolated user space instance associated with the application is not currently in an available state for running the application therein further comprises:

detecting that the isolated user space instance associated with the application is offline.

6. The computer implemented method of claim 4 wherein detecting that the isolated user space instance associated with the application is not currently in an available state for running the application therein further comprises:

detecting that the isolated user space instance associated with the application is faulted.

7. The computer implemented method of claim 1 wherein identifying one of the plurality of isolated user space instances which is currently in an available state for running the application therein further comprises:

reading the listing of current states of each one of the plurality of isolated user space instances.

8. The computer implemented method of claim 1 wherein identifying one of the plurality of isolated user space instances which is currently in an available state for running the application therein further comprises:

identifying an isolated user space instance that is online and not faulted.

9. The computer implemented method of claim 1 wherein determining that the application is to be moved from the specific isolated user space instance to a separate, isolated user space instance further comprises:

detecting that the application is not running, responsive to monitoring the current state of the application.

10. The computer implemented method of claim 9 wherein detecting that the application is not running further comprises:

detecting that the application is faulted.

11. The computer implemented method of claim 10 further comprising:

attempting to restart the application in the isolated user space instance associated with the application.

12. The computer implemented method of claim 9 wherein detecting that the application is not running further comprises:
    detecting that the application is offline.

13. The computer implemented method of claim 12 further comprising:
    starting-up the application in the isolated user space instance associated with the application.

14. A computer implemented method for failing-over an application between different ones of a plurality of isolated user space instances on a single instance of an operating system, the computer implemented method comprising the steps of:
    associating a specific one of the plurality of isolated user space instances on the single instance of the operating system with the application;
    running the application in the specific, isolated user space instance associated with the application;
    maintaining a listing of current states of each one of the plurality of isolated user space instances on the single instance of the operating system, each one the plurality of isolated user space instances being configured such that the application can run therein when the isolated user space instance is in an available state;
    determining that the application is to be moved from the specific isolated user space instance associated with the application to a separate, isolated user space instance which is currently in an available state for running the application therein;
    identifying one of the plurality of isolated user space instances which is currently in an available state for running the application therein, the identified isolated user space instance being separate from the specific isolated user space instance associated with the application;
    modifying the association between the application and the specific isolated user space instance, so that the application is no longer associated with the specific isolated user space instance and is instead associated with the separate, identified isolated user space instance;
    starting-up the application in the separate, identified isolated user space instance now associated with the application, thereby failing-over the application from the specific isolated user space instance on the single instance of the operating system to the separate, identified isolated user space instance on the single instance of the operating system;
    maintaining an application group comprising the application, an identifier of an isolated user space instance currently associated with the application, and resources used by the application; and
    for each separate one of the isolated user space instances, maintaining a separate isolated user space instance group, comprising resources used by the isolated user space instance.

15. The computer implemented method of claim 14 wherein:
    the application group is dependent upon at least one of the isolated user space instance groups being in an available state for running the application.

16. The computer implemented method of claim 14 wherein modifying the association between the application and the specific isolated user space instance, so that the application is no longer associated with the specific isolated user space instance and is instead associated with the separate, identified isolated user space instance further comprises:
    setting the identifier of the isolated user space instance currently associated with the application in the application group to identify the separate, identified isolated user space instance.

17. A computer implemented method for failing-over an application between different ones of a plurality of isolated user space instances on a single instance of an operating system, the computer implemented method comprising the steps of:
    associating a specific one of the plurality of isolated user space instances on the single instance of the operating system with the application;
    running the application in the specific, isolated user space instance associated with the application;
    maintaining a listing of current states of each one of the plurality of isolated user space instances on the single instance of the operating system, each one the plurality of isolated user space instances being configured such that the application can run therein when the isolated user space instance is in an available state;
    determining that the application is to be moved from the specific isolated user space instance associated with the application to a separate, isolated user space instance which is currently in an available state for running the application therein;
    identifying one of the plurality of isolated user space instances which is currently in an available state for running the application therein, the identified isolated user space instance being separate from the specific isolated user space instance associated with the application, wherein identifying one of the plurality of isolated user space instances which is currently in an available state for running the application therein further comprises, responsive to none of the isolated user space instances being in an available state for running the application therein, brining one of the isolated user space instances online, and identifying the brought-online one of the isolated user space instances as being currently in an available state for running the application therein;
    modifying the association between the application and the specific isolated user space instance, so that the application is no longer associated with the specific isolated user space instance and is instead associated with the separate, identified isolated user space instance; and
    starting-up the application in the separate, identified isolated user space instance now associated with the application, thereby failing-over the application from the specific isolated user space instance on the single instance of the operating system to the separate, identified isolated user space instance on the single instance of the operating system.

18. The computer implemented method of claim 17 wherein determining that the application is to be moved from the specific isolated user space instance to a separate, isolated user space instance further comprises:
    detecting that the isolated user space instance associated with the application is not currently in an available state for running the application therein, responsive to monitoring the current state of at least the isolated user space instance associated with the application.

19. The computer implemented method of claim 18 wherein detecting that the isolated user space instance associated with the application is not currently in an available state for running the application therein further comprises:
    detecting that the isolated user space instance associated with the application is offline.

20. The computer implemented method of claim 18 wherein detecting that the isolated user space instance associated with the application is not currently in an available state for running the application therein further comprises:

detecting that the isolated user space instance associated with the application is faulted.

\* \* \* \* \*